United States Patent [19]
Ranke et al.

[11] Patent Number: 5,133,954
[45] Date of Patent: Jul. 28, 1992

[54] PROCESS FOR REGENERATING A SCRUBBING AGENT LOADED WITH $H_2S$ AND/OR COS

[75] Inventors: Gerhard Ranke, Pöcking; Günter Weber, Altenmarkt, both of Fed. Rep. of Germany

[73] Assignee: Linde Aktiengesellschaft, Wiesbaden, Fed. Rep. of Germany

[21] Appl. No.: 679,840

[22] Filed: Apr. 1, 1991

Related U.S. Application Data

[63] Continuation of Ser. No. 349,461, May 9, 1989, abandoned.

[30] Foreign Application Priority Data

May 9, 1988 [DE] Fed. Rep. of Germany ....... 3815867

[51] Int. Cl.$^5$ ...................... B01D 53/14; C01B 17/05
[52] U.S. Cl. .................. 423/573.1; 423/226; 423/576.2; 423/576.7
[58] Field of Search .............. 423/226, 575, 576.2, 423/576.6, 576.7, 574 L, 573.1; 210/751, 758, 763, 765

[56] References Cited

U.S. PATENT DOCUMENTS

| 1,936,570 | 11/1933 | Bragg | 423/226 |
|---|---|---|---|
| 2,468,701 | 4/1949 | Cauley | 423/573.1 |
| 2,975,026 | 3/1961 | Mills | 423/226 |
| 4,203,953 | 5/1980 | Simoleit et al. | 423/575 |
| 4,483,833 | 11/1984 | Stogryn et al. | 423/226 |
| 4,537,752 | 8/1985 | Weber | 423/224 |
| 4,753,722 | 6/1988 | Le et al. | 210/758 |

FOREIGN PATENT DOCUMENTS

1021346  3/1966  United Kingdom ................ 423/226

OTHER PUBLICATIONS

L. C. Hardison, "Go from $H_2S$ to S in one unit", Apr. 1985, pp. 70–71.
Price, "$H_2S$-Removal Process Enhances Texas CO$_2$-Injection Operations", Oil and Gas Journal, May 25, 1987, pp. 44–54.
M. P. Helsel and F. J. Marold, "New Gas Scrubber Removes $H_2S$", Hydrocarbon Processing, Apr. 1987, pp. 35–37.

Primary Examiner—Jeffrey E. Russel
Attorney, Agent, or Firm—Millen, White & Zelano

[57] ABSTRACT

For regenerating a scrubbing agent loaded with $H_2S$ and/or COS, as well as optionally with other raw gas components to be recovered, the loaded scrubbing agent is mixed, preferably without prior heating, with an oxidatively acting solvent that is immiscible with the scrubbing agent, and the $H_2S$ dissolved in the immiscible solvent is converted to elementary sulfur.

35 Claims, 1 Drawing Sheet

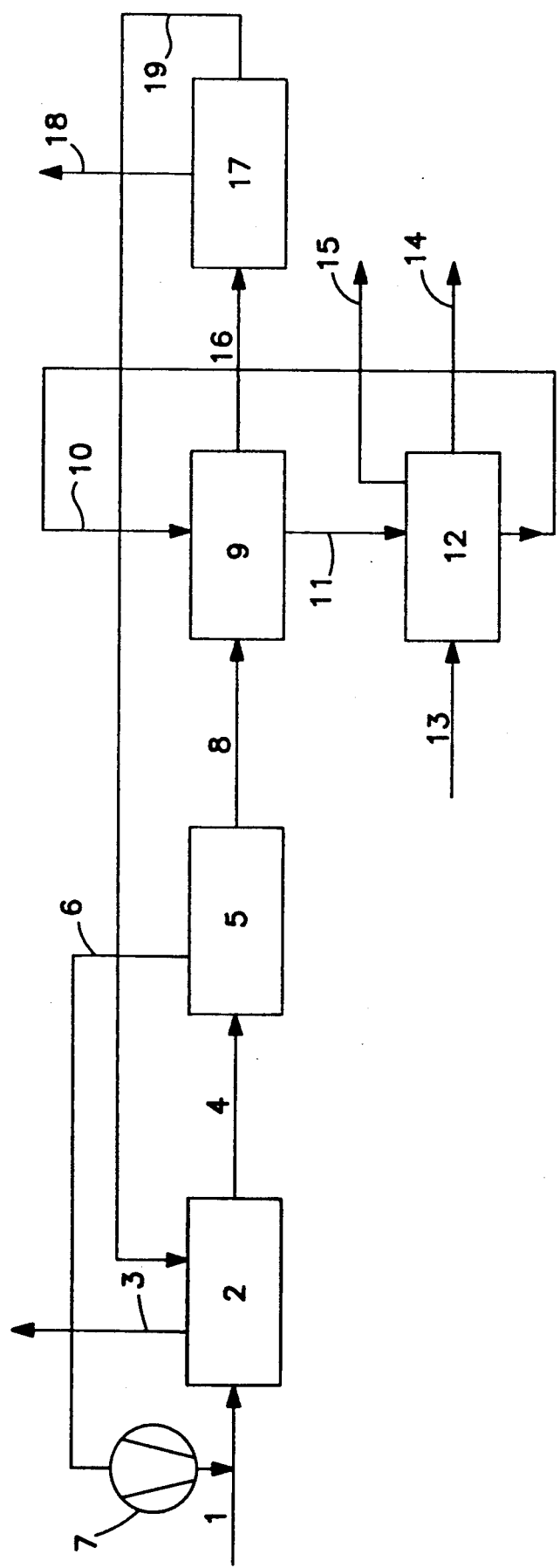

PROCESS FOR REGENERATING A SCRUBBING AGENT LOADED WITH $H_2S$ AND/OR COS

This application is a continuation of application Ser. No. 07/349,461, filed May 9, 1989, now abandoned.

FIELD OF THE INVENTION

This invention relates to a process for regenerating a scrubbing agent loaded with $H_2S$ and/or COS, as well as with other raw gas components to be recovered.

BACKGROUND OF THE INVENTION

Heretofore, it has been conventional for the removal of $H_2S$ from compressed gases first to scrub the $H_2S$ out of the gas by physically or chemically acting scrubbing agents; second, to drive the dissolved $H_2S$ out of the scrubbing agent, i.e., to regenerate the scrubbing agent; and, third, to work up the gaseous $H_2S$ into elementary sulfur or sulfuric acid.

Such processes for regenerating loaded absorption solutions are known, for example, from Ullmanns Enzyklopaedie der Technischen Chemie [Ullmann's Encyclopedia of Industrial Chemistry], fourth edition, volume 2, pages 586 to 589. Thus, in physical and physico-chemical pressure scrubbing processes, the loaded scrubbing agent is regenerated, as a rule, by expansion of the scrubbing agent. When chemical scrubbing agents are employed or when the gas to be scrubbed must meet high purity requirements, it is necessary to strip the loaded scrubbing agent with solvent vapor, steam, or with an inert gas.

Another type of regeneration occurs with scrubbing agents containing oxidation agents, since in such cases, absorbed hydrogen sulfide is converted into elementary sulfur with simultaneous reduction of the oxidizing agent. The loaded scrubbing solution is then conventionally regenerated by oxidation with oxygen or air.

The acid gas fraction accumulating during regeneration by expansion or stripping is normally further processed in Claus units or by oxidative scrubbing. While a relatively high $H_2S$ content is necessary for Claus units, with oxidative scrubbing, gases with low $H_2S$ content can be processed. It has been shown that especially with small amounts of sulfur, the tail gas treatment required downstream of Claus units is very uneconomical.

In principle, it is possible to use an oxidative hydrogen sulfide scrubbing process for desulfurizing a raw gas without using another acid gas scrubbing step downstream; however, because of the relatively low $H_2S$ absorbability of the scrubbing agent, operation at higher raw gas pressure is not efficient because of the greatly increased energy investment and maintenance requirements for pumping the scrubbing agent at such higher pressures.

Up to now, it was believed that oxidative hydrogen sulfide scrubbing operations were performed generally only for desulfurizing substantially unpressurized coke oven gas or acid gases containing little sulfur, for example from a methanol scrubbing step.

Thus the regeneration of loaded physical or chemical scrubbing agents is of great significance since, for physical and chemical scrubbing operations, the heat requirement for regeneration of the loaded scrubbing agent is the largest single energy cost. Regeneration with an inert gas, as is occasionally used in $CO_2$ scrubbing operations, is not efficient with $H_2S$ scrubbing operations, since in this case the amounts of gas fed to the sulfur extraction unit are increased excessively during the simultaneous reduction of the $H_2S$ concentration. For this reason, the dissolved $H_2S$ (like the other dissolved gases such as, e.g., $CO_2$) is generally driven out with a vaporizing scrubbing agent. If the scrubbing agent contains water, the regeneration temperatures are between 105° and 130° C.

It also turns out to be a drawback for regeneration that certain scrubbing agents such as, e.g., aromatics or cyclic hydrocarbon compounds, cannot be mixed with water and thus cannot be regenerated with steam. Consequently, in such cases, considerably higher regeneration temperatures and thus more costly vapors are needed for the regeneration.

For the above-mentioned reasons, it is clear that the known regeneration processes such as, e.g., stripping, are associated with considerable energy expense, and for pressurized scrubbing operations, there is the additional energy cost for the scrubbing agent pumps, the net result being that the regeneration system constitutes a considerable part of the operating costs of desulfurization.

SUMMARY OF THE INVENTION

An object of one aspect of this invention is to provide an improved process for the regeneration of a scrubbing agent loaded with $H_2S$ and/or COS, especially for scrubbing operations conducted at high pressure.

Upon further study of the specification and appended claims, further objects and advantages of this invention will become apparent to those skilled in the art.

To attain these objects, the loaded scrubbing agent is mixed with an oxidatively acting solvent immiscible with the scrubbing agent and the $H_2S$ dissolved in it is oxidatively converted to elementary sulfur.

It was found that the reaction known from oxidative scrubbing for converting $H_2S$ into elementary sulfur is not limited to gaseous $H_2S$ but that the reaction also takes place when the $H_2S$ is dissolved in another scrubbing agent.

Thus it is possible, instead of regenerating a scrubbing agent loaded with $H_2S$ and/or COS by stripping gas or heating and partial vaporization of the scrubbing agent and recovery of a gaseous $H_2S$ fraction, to convert the dissolved $H_2S$ directly—in an advantageous way without prior heating—with an oxidatively acting solvent into elementary sulfur and, in this way, to recover an $H_2S$-free scrubbing agent for repeated scrubbing of $H_2S$ out of the raw gas.

It is important that the scrubbing agent used for the desulfurization is sufficiently immiscible with the oxidatively acting solvent so that the two liquids can be separated easily.

In the context of this invention, by immiscible is generally meant that at 20° C. the scrubbing agent dissolves in the oxidatively acting solvent to an extent of not more than 3 ml per 100 ml of scrubbing agent, preferably less than 1 ml per 100 ml of scrubbing agent and the scrubbing agent is soluble in the oxidatively acting solvent to an extent of less than 5 ml per 100 ml of scrubbing agent, preferably less than 1.5 ml per 100 ml of scrubbing agent.

Also, in the context of this invention, by high raw gas pressure is meant generally in the range of 20 to 150, especially 30 to 100 bars.

As the scrubbing agent for the desulfurization, according to the invention physical scrubbing agents are used, preferably cyclic hydrocarbon compounds or N-and/or O-containing hydrocarbon compounds, which have been found to be especially suited for scrubbing $H_2S$ out of $CO_2$-rich raw gases. Moreover, these scrubbing agents belong to the group of scrubbing agents that are immiscible with water, thereby facilitating the use of the regeneration process according to the invention resulting in concomitant energy and cost savings. Specific examples of preferred scrubbing agents include, but are not limited to, Tetralin, methylnaphthalene or pyridine.

To recover as pure a sulfur as possible and to keep the solvent losses as low as possible, suitably an aqueous alkaline solvent is used that contains pentavalent vanadium as the oxidation agent and a promoter and, as the promoter, an organic nitrogen compound, e.g., an amine.

Advantageously, as the nitrogen-containing promoter there is used a compound from the group of the alkyl amines, alkanol amines, cyclic nitrogen compounds, amino carboxylic acids, aminosulfonic acids or aminosulfuric acids. As an alkyl amine there can be used a mono- or poly-amine, preferably diethylenamine, butylamine, triethylenetetramine, hexamethylenediamine or N, N'-bis-(3-aminopropyl)-ethylenediamine. As a suitable alkanol amine, mono-, di- or tri-ethanolamine, dimethylethanolamine, methyldiethanolamine or methylaminoethanol can be used. As a cyclic nitrogen compound piperidine is especially suited. From the classes mentioned above, other compounds can also be used, such as, e.g., tetrapropylenepentamine, tetraethylenepentamine, triethylenetetramine, tripropylenetetramine, and 3,2-aminoethylaminopropylenamine.

The promoters to be used according to the invention have the advantage that they accelerate the reoxidation of the tetravalent vanadium, and they keep the reduced vanadium in solution. The reoxidation of the reduced vanadium often takes place very quickly, permitting small vessels and small amounts of solvent and thus cost savings. Further, the addition of a complexing agent for vanadium, such as citric acid or tartaric acid, can be eliminated, also providing a cost savings.

The promoter can be used in a concentration of 10 to 100 g/l, preferably 30 to 50 g/l. These indicated values depend greatly on the promoter used, as well as on the vanadium concentration. Accordingly, for each promoter, an optimum concentration range can be found within the indicated boundaries. In general, with the use of lower amounts than 10 g/l, the oxygen activation effect of the promoter would no longer be ensured The upper limit, in contrast, can be exceeded with a corresponding promoter but with generally no adverse effort.

Especially advantageously used for regeneration is a solvent containing $Na_2CO_3$, vanadium, NaSCN, and a promoter. The vanadium concentration is generally proportioned according to the amount of dissolved $H_2S$ in the scrubbing agent.

Other oxidation systems can also be used as long as the solvent is immiscible with the scrubbing agent, and the $H_2S$ is oxidized to sulfur. For examples of such other systems, reference is directed to "$H_2S$ Removal Process Enhances $CO_2$ Injection Operation", Oil and Gas Journal May 25, 1987 dealing with a soluble reactive organo-metallic complex containing iron or "Go From $H_2S$ to S in One Unit" Hydrocarbon Processing, April 1985.

According to a preferred embodiment of the process according to the invention, the elementary sulfur is removed from of an extraction vessel as a solid and worked up into liquid sulfur.

Especially with $CO_2$-rich raw gases it is advantageous to expand the loaded scrubbing agent before regeneration from the raw gas pressure to the pressure of the extraction vessel. In this case, a gaseous fraction accumulates which, besides $CO_2$, contains still other coabsorbed gases as well as small amounts of $H_2S$ and/or COS because, if COS were supposed to be scrubbed out in the raw gas scrubbing step, then it is partially released during the expansion. Then this gaseous fraction, according to the invention, is preferably fed to an oxidative $H_2S$ scrubbing, and the resultant loaded scrubbing agent is worked up together with the liquid fraction of the extraction stage. Consequently, the fraction can be compressed from the expanded pressure of generally about 50 to 6 bars to the raw gas pressure and then combined with the raw gas.

If the gaseous fraction also contains COS, then it is provided according to the invention that, after the $H_2S$ scrubbing, the expanded fraction is subjected to a catalytic hydrogenation to convert the COS into $H_2S$ and the latter is then fed to an oxidative $H_2S$ scrubbing or is compressed and recycled.

It can also be advantageous to couple this kind of scrubbing agent regeneration with the recovery of other components from the raw gas. Thus, it is proposed according to the invention to feed the scrubbing agent, after sulfur separation, to a $C_{3+}$ recovery step, which is especially advantageous in the case of natural gas desulfurization with aromatics. Since $H_2S$ and, e.g., $C_3H_8$ cannot be completely separated by rectification, $H_2S$ and $C_{3+}$ hydrocarbons are scrubbed out of the raw gas together, the $H_2S$ dissolved in the scrubbing agent is extracted with the oxidative solvent and the resultant sulfur-free scrubbing agent is fed to a $C_{3+}$ recovery step. In general, the $C_{3+}$ recovery step can be any conventional separation step, e.g., heating or stripping, or flashing and subsequent purification or liquification according to the requested specification of the $C_{3+}$ product.

This kind of desulfurization of raw gases, such as for example natural gases, gases from coal gasification or from refining processes, coupled with recovery according to the invention of elementary sulfur, is especially suitable for gases with $H_2S$ content that is not too high and with simultaneously high raw gas pressure. In general, for the most benefit to be gained from this invention, the $H_2S$ content should be less than 5 mol % and preferably less than 1 mol %.

Since, in the regeneration according to the invention of the loaded scrubbing agent, only $H_2S$ is converted, the overall composition of the raw gas and the components of the raw gas scrubbed out in addition to the $H_2S$ are generally irrelevant for the $H_2S$ conversion, as long as no components are contained in the raw gas that cause undesired secondary reactions during the oxidative scrubbing. Thus the process according to the invention is also preferably used for regenerating loaded scrubbing agent from a scrubbing operation resulting in a disadvantageous $CO_2/H_2S$ mol ratio, e.g., 100 to 20 mole of $CO_2$ per mol of $H_2S$.

Basically, it is reiterated that the process according to the invention is suitable for regeneration of loaded scrubbing agents, as long as they are immiscible with the oxidatively acting solvent.

The process according to the invention has the advantage here that, for regeneration, no additional heat requirement and no expensive regeneration columns are necessary, advantageously influencing investment and operating costs. In general, the step of mixing the scrubbing agent with the oxidatively acting immiscible solvent is conducted at about 10° to 65° C., preferably 20° C. to 45° C. and at about 10 to 1 bars, preferably 5 to 1.5 bars.

DESCRIPTION OF THE DRAWING

The drawing is a block diagram of a comprehensive embodiment of the invention, the details of which are explained as follows:

By pipe 1, 100,000 Nm³/h of a raw gas is fed at a pressure of 70 bars to a scrubbing column 2. Here the raw gas has the following composition:

| | |
|---|---|
| CH$_4$ | 80.9 mol % |
| C$_2$H$_6$ | 10 mol % |
| C$_{3+}$ | 3 mol % |
| CO$_2$ | 6 mol % |
| H$_2$S | 0.1 mol % |

In scrubbing column 2, C$_{3+}$ and H$_2$S are scrubbed out of the raw gas with Tetralin (tetrahydronaphthalene) as the scrubbing agent. Since the scrubbing agent is very selective with respect to H$_2$S and C$_{3+}$, only relatively little CO$_2$, CH$_4$ and C$_2$H$_6$ is also scrubbed out. The resultant scrubbed gas is delivered by pipe 3 as a product with an H$_2$S content of 4 ppm.

The loaded scrubbing agent is then fed by pipe 4 to an expansion vessel 5 and expanded to an intermediate pressure of 8 bars. The released gases—mostly CH$_4$, C$_2$H$_6$, and CO$_2$—are compressed to the raw gas pressure (pipe 6, compressor 7) and mixed into the raw gas (pipe 1) upstream of the scrubbing step.

The partially expanded scrubbing agent, which still contains practically all the H$_2$S and C$_{3+}$ in the dissolved state, is then extracted (8, 9) with an oxidative solvent that is immiscible with Tetralin and is fed by pipe 10. In this case, the dissolved H$_2$S reacts with the solvent with the formation of elementary sulfur. By pipe 11, the sulfur-containing solvent is fed to a regeneration vessel 12 where it is treated with air (pipe 13); and, simultaneously, the formed solid sulfur is separated (pipe 14). Exhaust air from the regeneration vessel is removed by pipe 15. The extraction step and the regeneration of the oxidative solvent are conducted at about 20° C. and 40° C., respectively.

The H$_2$S-free scrubbing agent from extraction stage 9 is fed by pipe 16 to a C$_{3+}$ recovery stage 17, where the C$_{3+}$-hydrocarbons still dissolved in the scrubbing agent are driven off and delivered by pipe 18 as product. The now completely regenerated scrubbing agent is recycled to scrubbing column 2 by pipe 19.

The oxidative solvent of this embodiment is described in "New Gas-Scrubber Removes H$_2$S", Hydrocarbon Processing, April 1987.

In general, the extraction of H$_2$S from the loaded scrubbing agent into the solvent is conducted by contacting the phases conventionally, e.g., in an countercurrent extraction column.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire texts of all applications, patents, and publications, if any, cited above, and of corresponding West German Application No. P 38 15 867.1, filed May 9, 1988, are hereby incorporated by reference.

What is claimed is:

1. A process for regenerating a scrubbing agent loaded with at least H$_2$S, comprising mixing the loaded scrubbing agent with an oxidatively acting solvent that is immiscible with the scrubbing agent, to extract H$_2$S and so that resultant H$_2$S dissolved in the immiscible solvent is oxidatively converted to elementary sulfur wherein the loaded scrubbing agent is mixed without prior heating of the scrubbing agent, said oxidatively acting solvent being an aqueous alkaline solvent containing (a) pentavalent vanadium and (b) an organic nitrogen-containing promoter.

2. A process according to claim 1, wherein a physically acting scrubbing agent issued as the scrubbing agent.

3. A process according to claim 2, wherein a hydrocarbon compound is employed as the scrubbing agent.

4. A process according to claim 3, wherein a cyclic hydrocarbon compound is used as the scrubbing agent.

5. A process according to claim 1, wherein tetralin, methylnaphthalene, or pyridine is used as a scrubbing agent.

6. A process according to claim 1, wherein the nitrogen-containing promoter is an alkyl amine, an alkanol amine, a cyclic nitrogen compound, an amino carboxylic acid, an aminosulfonic acid or an aminosulfuric acid.

7. A process according to claim 6, wherein the promoter is a mono-, di-, or triethanolamine, dimethylethanolamine, methyldiethanolamine or methylaminoethanol.

8. A process according to claim 7, wherein the promoter is added in a concentration of 10 to 100 g/l.

9. A process according to claim 6, wherein the promoter is added in a concentration of 10 to 100 g/l.

10. A process according to claim 1, wherein the promoter is added in a concentration of 10 to 100 g/l.

11. A process according to claim 1, wherein the elementary sulfur is removed from an extraction vessel as a solid.

12. A process according to claim 11, wherein the sulfur removed as a solid is worked up into liquid sulfur.

13. A process according to claim 1, wherein the scrubbing agent, after sulfur separation, is fed to C$_{3+}$ recovery step.

14. A process according to claim 1, wherein the scrubbing agent is tetrahydronaphthalene.

15. A process according to claim 14, wherein the scrubbing step in conducted at 20–150 bars and the mixing step is conducted at a pressure of about 1 to 10 bars and a temperature of about 10° to 65° C.

16. A process for regenerating a scrubbing agent loaded with at least H$_2$S, comprising mixing the loaded scrubbing agent with an oxidatively acting solvent that is immiscible with the scrubbing agent, to extract H$_2$S and so that resultant H$_2$S dissolved in the immiscible solvent is oxidatively converted to elementary sulfur wherein, before regeneration, the loaded scrubbing agent is expanded from raw gas pressure to the pressure of the extraction stage to evolve an $H_2S$ and/or COS-containing gas fraction; the $H_2S$ and/or COS-containing gas fraction accumulating during expansion is added to an oxidative $H_2S$ scrubbing; and resultant loaded scrubbing agent is worked up together with resultant sulfur-containing liquid fraction from the reaction vessel.

17. Process according to claim 16, wherein the gaseous fraction, after the $H_2S$ scrubbing, is subjected to catalytic hydrogenation to convert COS into $H_2S$, and resultant $H_2S$ is then fed to one of the oxidative $H_2S$ scrubbings.

18. A process for regenerating a scrubbing agent loaded with at least $H_2S$, comprising mixing the loaded scrubbing agent with an oxidatively acting solvent that is immiscible with the scrubbing agent, to extract $H_2S$ and so that resultant $H_2S$ dissolved in the immiscible solvent is oxidatively converted to elementary sulfur, wherein an aqueous, alkaline solvent containing both pentavalent vanadium and a promotor is used as the oxidatively active solvent, said promoter being an organic nitrogen compound.

19. A process according to claim 18, wherein, as the nitrogen-containing promoter is an alkyl amine, an alkanol amine, a cyclic nitrogen compound, an amino carboxylic acid, an aminosulfonic acid or an aminosulfuric acid.

20. A process according to claim 19, wherein the promoter is a mono-, di-, or triethanolamine, dimethylethanolamine, emthyldiethanolamine or methylaminoethanol.

21. A process according to claim 19, wherein the promoter is added in a concentration of 10 to 100 g/l.

22. A process according to claim 18, wherein the scrubbing agent is tetrahydronaphthalene.

23. A process according to claim 19, wherein the scrubbing agent is tetrahydronaphthalene.

24. A process according to claim 26, wherein the scrubbing agent is tetrahydronaphthalene.

25. A process according to claim 21, wherein the scrubbing agent is tetrahydronaphthalene.

26. A process for regenerating a scrubbing agent loaded with at least $H_2S$, comprising mixing the loaded scrubbing agent with an oxidatively acting solvent that is immiscible with the scrubbing agent, to extract $H_2S$ and so that resultant $H_2S$ dissolved in the immiscible solvent is oxidatively converted to elementary sulfur, wherein, before regeneration, the loaded scrubbing agent is expanded from raw gas pressure to the pressure of the extraction stage to evolve an $H_2S$ and/or COS-containing gas fraction, said $H_2S$ and/or COS-containing gas fraction accumulating during expansion is added to an oxidative $H_2S$ scrubbing, and resultant loaded scrubbing agent is worked up together with resultant sulfur-containing liquid fraction from the extraction vessel.

27. A process according to claim 26, wherein the gaseous fraction, after the $H_2S$ scrubbing, is subjected to a catalytic hydrogenation to convert COS into $H_2S$, and resultant $H_2S$ is then fed to one of the oxidative $H_2S$ scrubbings.

28. A process for regenerating a scrubbing agent loaded with at least $H_2S$, comprising mixing loaded scrubbing agent with an oxidatively acting solvent that is immiscible with the scrubbing agent, to extract $H_2S$ and so that resultant $H_2S$ dissolved in the immiscible solvent is oxidatively converted to elementary sulfur, wherein the scrubbing agent, after sulfur separation, is fed to a $C_{3+}$ recovery step.

29. A process for regenerating a scrubbing agent loaded with at least $H_2S$, comprising mixing the loaded scrubbing agent with an oxidatively acting aqueous alkaline solvent that is immiscible with the scrubbing agent, to extract $H_2S$ and so that resultant $H_2S$ dissolved in the immiscible solvent is oxidatively converted to elementary sulfur.

30. A process according to claim 29, wherein a hydrocarbon compound is employed as the scrubbing agent.

31. A process according to claim 29, wherein a cyclic hydrocarbon compound is used as the scrubbing agent.

32. A process according to claim 29, wherein the elementary sulfur is removed from an extraction vessel as a solid.

33. A process for regenerating a scrubbing agent loaded with at least $H_2S$ resulting from scrubbing raw gas in a scrubber column, comprising expanding the loaded scrubbing agent so as to evolve an $H_2S$ and/or COS-containing gas fraction and a resultant pressure-reduced scrubbing agent containing most of the $H_2S$;

compressing the evolved gas fraction to the pressure of raw gas entering said scrubbing column, and scrubbing said raw gas and resultant compressed evolved gas fraction together in said scrubbing column;

mixing said resultant pressure-reduced scrubbing agent with an oxidatively acting solvent that is immiscible with the scrubbing agent, to extract $H_2S$ and so that resultant $H_2S$ dissolving in the immiscible solvent is oxidatively converted to elementary sulfur.

34. A process according to claim 33, wherein the scrubbing agent is water-immiscible.

35. A process according to claim 34, wherein the oxidatively acting solvent is alkaline.

* * * * *

UNITED STATES PATENT AND TRADEMARK OFFICE
CERTIFICATE OF CORRECTION

PATENT NO. : 5,133,954
DATED : July 28, 1992
INVENTOR(S) : Gerhard RANKE et al.

It is certified that error appears in the above-identified patent and that said Letters Patent is hereby corrected as shown below:

Claim 20; Line 32; Col. 7:

delete " emthyldiethanolamine " and insert - - methyldiethanolamine

Signed and Sealed this

Thirty-first Day of August, 1993

Attest:

BRUCE LEHMAN

Attesting Officer    Commissioner of Patents and Trademarks